United States Patent
Jiang et al.

(10) Patent No.: US 9,263,876 B2
(45) Date of Patent: Feb. 16, 2016

(54) MULTI-PHASE SWITCHING CONVERTER WITH OVER CURRENT PROTECTION AND CONTROL METHOD THEREOF

(71) Applicant: Chengdu Monolithic Power Systems Co., Ltd., Chengdu (CN)

(72) Inventors: Lijie Jiang, Hangzhou (CN); Xiaokang Wu, Hangzhou (CN); Qian Ouyang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 453 days.

(21) Appl. No.: 13/944,752

(22) Filed: Jul. 17, 2013

(65) Prior Publication Data

US 2014/0022684 A1   Jan. 23, 2014

(30) Foreign Application Priority Data

Jul. 19, 2012 (CN) .......................... 2012 1 0250469

(51) Int. Cl.
*H02H 3/00* (2006.01)
*H02H 3/08* (2006.01)
*H02M 3/158* (2006.01)
*H02M 1/32* (2007.01)

(52) U.S. Cl.
CPC .............. *H02H 3/08* (2013.01); *H02M 3/1584* (2013.01); *H02M 1/32* (2013.01); *H02M 2003/1586* (2013.01)

(58) Field of Classification Search
CPC ........................................................ H02M 1/32
USPC ............................................................ 361/18
See application file for complete search history.

(56) References Cited

U.S. PATENT DOCUMENTS

| | | | | |
|---|---|---|---|---|
| 4,879,624 A | * | 11/1989 | Jones ..................... | H02H 3/021 307/64 |
| 6,229,722 B1 | * | 5/2001 | Ichikawa ................ | H02M 7/10 363/71 |
| 7,359,223 B2 | * | 4/2008 | Datta ...................... | H02M 7/49 363/37 |
| 8,400,778 B2 | | 3/2013 | Hsing et al. | |
| 8,896,278 B2 | * | 11/2014 | Ouyang ................... | G05F 1/10 323/267 |
| 9,190,871 B2 | * | 11/2015 | Pfitzer .................... | H01H 21/24 |
| 2011/0025284 A1 | | 2/2011 | Xu et al. | |
| 2012/0274293 A1 | | 11/2012 | Ren et al. | |

* cited by examiner

*Primary Examiner* — Stephen W Jackson
(74) *Attorney, Agent, or Firm* — Perkins Coie LLP (57) ABSTRACT

A multi-phase switching converter includes a plurality of switching circuits and a controller. The output terminals of the plurality of switching circuits are coupled together to provide an output voltage to a load. The controller is configured to generate a plurality of control signals to control the plurality of switching circuits. When an over current condition of a current switching circuit of the plurality of switching circuits is detected, the controller skips the current switching circuit and successively turns on the remaining plurality of switching circuits that have not yet been turned on and where an over current condition has not been detected.

17 Claims, 7 Drawing Sheets

MULTI-PHASE SWITCHING CONVERTER WITH OVER CURRENT PROTECTION AND CONTROL METHOD THEREOF

CROSS-REFERENCE TO RELATED APPLICATION(S)

This application claims the benefit of CN application 201210250469.1, filed on Jul. 19, 2012, and incorporated herein by reference.

TECHNICAL FIELD

The present invention generally relates to electronic circuits, and more particularly but not exclusively to multi-phase switching converters and control methods thereof.

BACKGROUND

In power solutions of high performance CPU, switching converters with lower output voltage and higher output current are required Multi-phase switching converters are widely used in these applications because of its good performance.

The multi-phase switching converter comprises a plurality of switching circuits. The output terminals of the switching circuits are coupled together to provide energy to a load. In prior arts, when an over current condition is detected, all the switching circuits of the multi-phase switching converter are turned off until the over current condition disappears or the multi-phase switching converter is restarted. So, any over current condition of the switching circuits will induce the whole multi-phase switching converter to be shut down.

SUMMARY

Embodiments of the present invention are directed to a multi-phase switching converter comprising a plurality of switching circuits and a controller. The output terminals of the plurality of switching circuits are coupled together to provide an output voltage to a load. The controller is configured to generate a plurality of control signals to control the plurality of switching circuits. When an over current condition of a current switching circuit of the plurality of switching circuits is detected, the controller skips the current switching circuit and successively turns on the other switching circuits.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Embodiments of the present invention are directed to a multi-phase switching converter comprising a plurality of switching circuits. During normal operation, all of the switching circuits are turned on successively. When an over current condition of a current switching circuit of the plurality of switching circuits is detected, instead of shutting down the whole multi-phase switching converter, the current switching circuit is skipped and the other switching circuits are turned on successively. In this specification, multi-phase switching converters with constant on-time control are set as examples to describe the embodiments. However, persons skilled in the art can recognize that the present invention can also be applied to multi-phase switching converters with any other control method.

Figure 1:
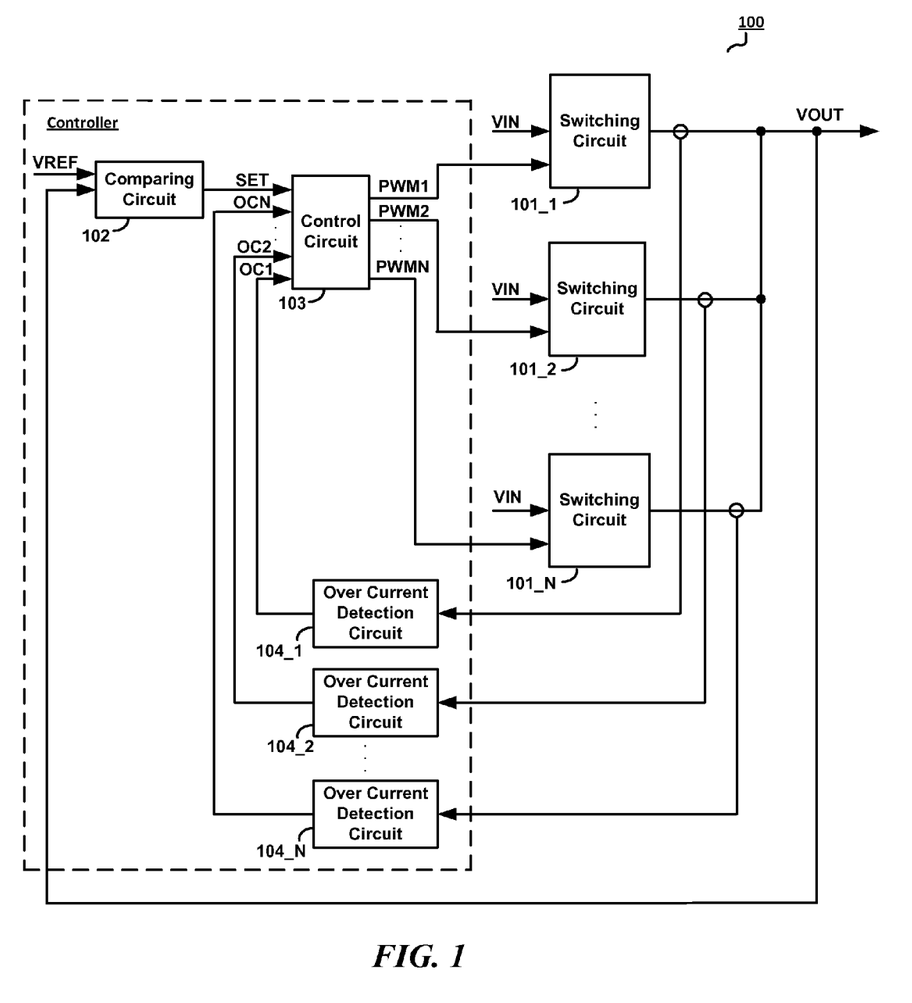
FIG. 1 is a block diagram of a multi-phase switching converter 100 in accordance with one embodiment of the present invention.

FIG. 1 is a block diagram of a multi-phase switching converter 100 in accordance with one embodiment of the present invention. The multi-phase switching converter 100 comprises a plurality of switching circuits 101_1~101_N, wherein N is an integer larger than 1. The input terminals of the switching circuits 101_1~101_N are configured to receive an input voltage VIN, the output terminals of the switching circuits 101_1~101_N are coupled together to provide an output voltage VOUT to a load. The switching circuits 101_1~101_N may be configured in any known DC/DC or AC/DC topology, such as BUCK converter, BOOST converter, Flyback converter and so on. The controller generates control signals PWM1~PWMN to control the switching circuits 101_1~101_N. When an over current condition of a current switching circuit of the plurality of switching circuits is detected, the controller skips the current switching circuit and successively turns on the other switching circuits.

The controller comprises a comparing circuit 102, over current detection circuits 104_1~104_N and a control circuit 103. The comparing circuit 102 compares the output voltage VOUT with a reference signal VREF to generate a comparison signal SET. The over current detection circuits 104_1~104_N are respectively coupled to the switching circuits 101_1~101_N. The over current detection circuits 104_1~104_N are configured to detect the over current condition of the switching circuits 101_1~101_N, and configured to generate over current detection signals OC1~OCN based on the detection. The over current detection circuits 104_1~104_N may detect the over current condition through monitoring the output current or other related electrical parameters of the switching circuits. The control circuit 103 is coupled to the comparing circuit 102 and the over current detection circuits 104_1~104_N to receive the comparison signal SET and the over current detection signals OC1~OCN. Based on the comparison signal SET and the over current detection signals OC1~OCN, the control circuit 103 generates the plurality of control signals PWM1~PWMN.

Generally, when the comparison signal SET is logical high which indicates the output voltage VOUT is smaller than the reference signal VREF, the control circuit 103 turns on the corresponding switching circuit to provide energy to the load. The switching circuit is turned off by the control circuit 103 when its on-time reaches a time threshold.

In one embodiment, the multi-phase switching converter 100 further comprises a feedback circuit having an input terminal and an output terminal. The input terminal of the feedback circuit is coupled to the output terminals of the switching circuits 101_1~101_N to receive the output voltage VOUT, the output terminal is coupled to the comparing circuit 102 to provide a feedback signal representative of the output voltage VOUT. In one embodiment, in order to eliminate the sub-harmonic oscillation on the output voltage VOUT, the controller 103 further comprises a slope compensation circuit configured to generate a slope compensation signal. The slope compensation signal may be added to the output voltage VOUT or the feedback signal, or be subtracted from the reference signal VREF.

Figure 2:
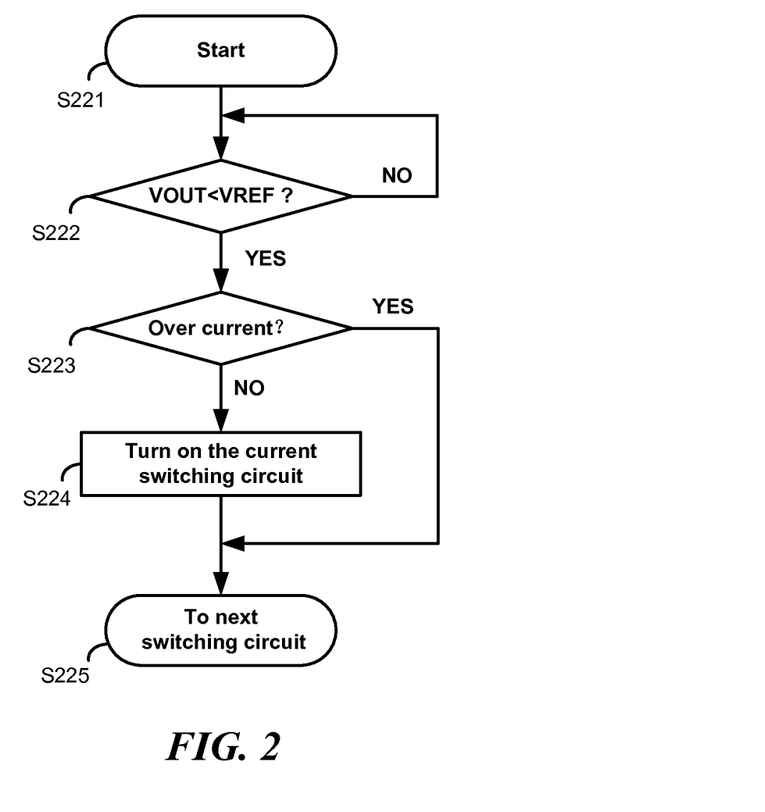
FIG. 2 is a working flow chart of the multi-phase switching converter 100 shown in FIG. 1 in accordance with one embodiment of the present invention.

FIG. 2 is a working flow chart of the multi-phase switching converter 100 shown in FIG. 1 in accordance with one embodiment of the present invention. It comprises steps S221~S225.

At step S221, the control of the current switching circuit is started.

At step S222, whether the output voltage VOUT is smaller than the reference signal VREF is detected. If the output voltage VOUT is smaller than the reference signal VREF, go to step S223, else, keep detecting.

At step S223, whether the current switching circuit is over current is detected. If an over current condition of the current switching circuit is detected, go to step S225, else, go to step S224.

At step S224, the current switching circuit is turned on.

At step S225, turn into the control of the next switching circuit

In one embodiment, when an over current condition of the current switching circuit is detected, the current switching circuit is not skipped immediately. The controller 103 keeps the current switching circuit. If the duration of the over current condition reaches a predetermined time threshold, the current switching circuit will be skipped. Else, the current switching circuit will be turned on and the multi-phase switching converter will resume its normal operation.

Figure 3:
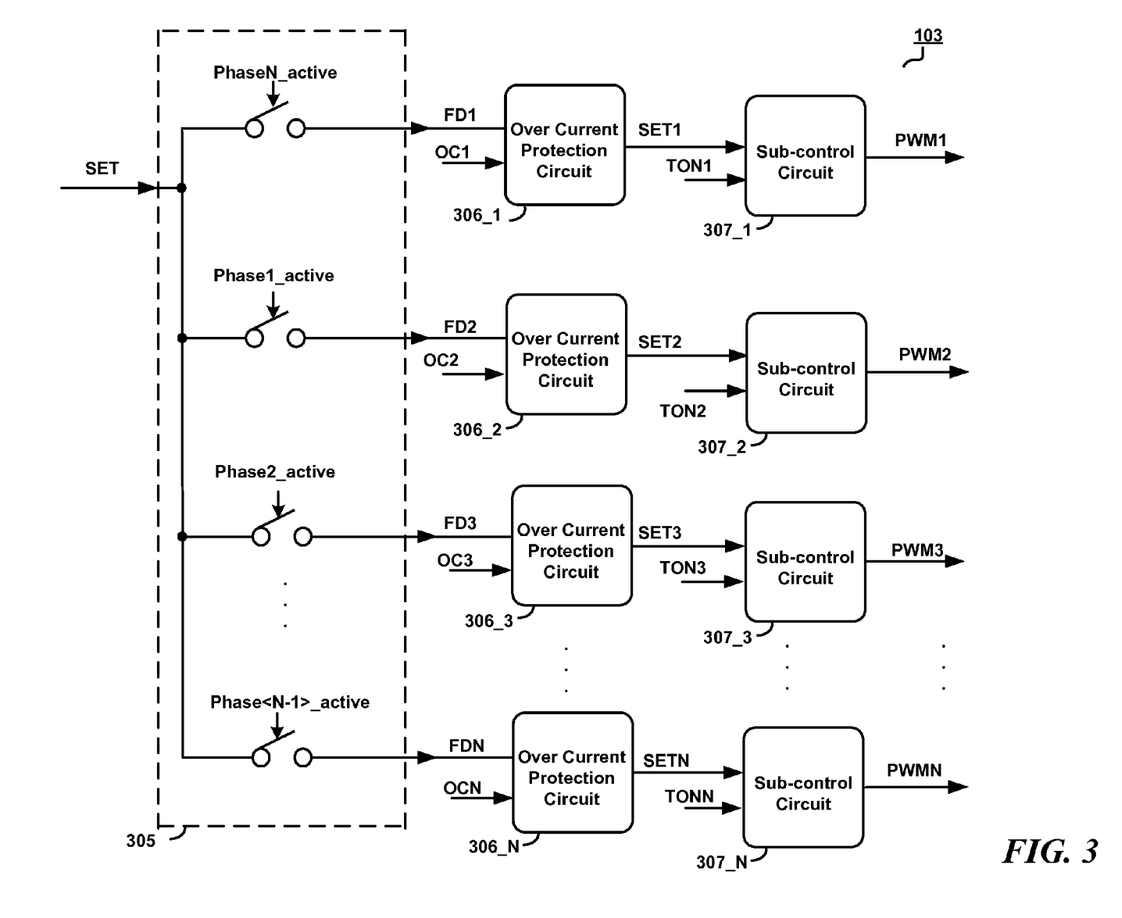
FIG. 3 schematically illustrates the control circuit 103 shown in FIG. 1 in accordance with one embodiment of the present invention.

FIG. 3 schematically illustrates the control circuit 103 shown in FIG. 1 in accordance with one embodiment of the present invention. The control circuit 103 comprises a frequency divider 305, over current protection circuits 306_1~306_N and sub-control circuits 307_1~307_N. The frequency divider 305 has an input terminal and N output terminals, wherein the input terminal is coupled to the comparing circuit 102 to receive the comparison signal SET. Based on the comparison signal SET, the frequency divider 305 respectively generates frequency dividing signals FD1~FDN at the output terminals. Each of the over current protection circuits 306_i has a first input terminal, a second input terminal and an output terminal, wherein i=1, 2 . . . N. The first input terminal of the over current protection circuit 306_i is coupled to the corresponding output terminal of the frequency divider 305 to receive the frequency dividing signal FDi, the second input terminal is coupled to the corresponding over current detection circuit 104_i to receive the over current detection signal OCi. Based on the frequency dividing signal FDi and the over current detection signal OCi, the over current protection circuit 306_i generates a set signal SETi at the output terminal. When an over current condition of the switching circuit 101_i is detected, the over current protection circuit 306_i deactivates the set signal SETi to maintain the switching circuit 101_i off.

Each of the sub-control circuits 307_i has a first input terminal, a second input terminal and an output terminal, and wherein the first input terminal is coupled to the output terminal of the corresponding over current protection circuit 306_i to receive the set signal SETi, the second input terminal is configured to receive an on-time signal TONi indicating the expected on-time of the corresponding switching circuit 101_i, and the output terminal is coupled to the corresponding switching circuit 101_i to provide the control signal PWMi. The expected on-time of the switching circuit may be a constant value, or a variable value related to the input voltage VIN and/or the output voltage VOUT.

In the embodiment shown in FIG. 3, the frequency divider 305 comprises N transistors controlled by phase active indication signals Phase1_active~PhaseN_active. When the phase active indication signal Phase1_active is valid (such as logical high) which indicates the first switching circuit 101_1 has been activated, the comparison signal SET will be transmitted to the over current protection circuit 306_2 as the frequency dividing signal FD2. When the phase active indication signal Phase2_active is valid which indicates the second switching circuit 101_2 has been activated, the comparison signal SET will be transmitted to the over current protection circuit 306_3 as the frequency dividing signal FD3. Similarly, when the phase active indication signal PhaseN_active is valid which indicates the switching circuit 101_N has been activated, the comparison signal SET will be transmitted to the over current protection circuit 306_1 as the frequency dividing signal FD1. During normal operation, the phase active indication signals Phase1_active~PhaseN_active are validated successively. If one switching circuit, such as 101_K (K=2, 3, . . . , N), needs to be skipped because of its over current condition, the phase active indication signal Phase(K−1)_active will be invalidated and the phase active indication signal PhaseK_active will be validated instead. If the first switching circuit 101_1 needs to be skipped because of its over current condition, the phase active indication signal PhaseN_active will be invalidated and the phase active indication signal Phase1_active will be validated instead.

Figure 4:
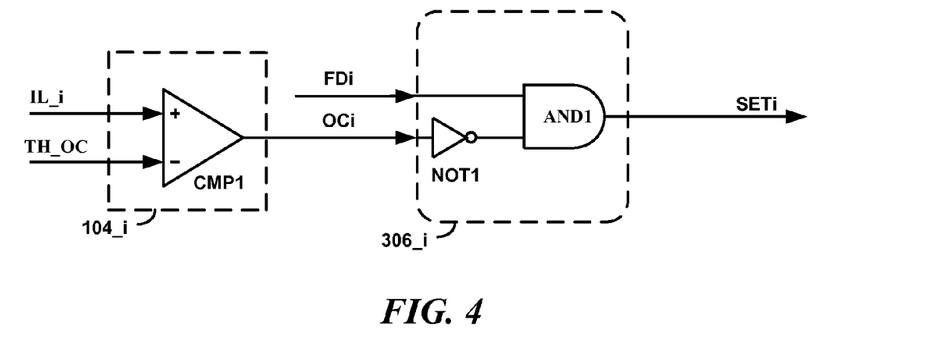
FIG. 4 schematically illustrates an over current detection circuit and an over current protection circuit in accordance with one embodiment of the present invention.

FIG. 4 schematically illustrates an over current detection circuit and an over current protection circuit in accordance with one embodiment of the present invention. The over current detection circuit 104_i comprises a comparator CMP1. The comparator CMP1 has a non-inverting input terminal, an inverting input terminal and an output terminal, wherein the non-inverting input terminal is configured to receive a current sensing signal IL_i indicating the output current of the corresponding switching circuit 101_i, the second input terminal is configured to receive an over current threshold voltage TH_OC. The comparator CMP1 compares the current sensing signal IL_i with the over current threshold voltage TH_OC, and generates the over current detection signal OCi at the output terminal. The over current protection circuit 306_i comprises a NOT gate circuit NOT1 and an AND gate circuit AND1. The NOT gate circuit NOT1 has an input terminal and an output terminal, wherein the input terminal is coupled to the over current detection circuit 104_i to receive the over current detection signal OCi. The AND gate circuit AND1 has a first input terminal, a second input terminal and an output terminal, wherein the first input terminal is coupled to the corresponding output terminal of the frequency divider 305 to receive the frequency dividing signal FDi, the second input terminal is coupled to the output terminal of the NOT gate circuit NOT1, and the output terminal is configured to provide the set signal SETi.

Referring to FIG. 4, when the current sensing signal IL_i is larger than the over current threshold voltage TH_OC, the over current condition of the switching circuit 101_i is detected. The over current detection signal OCi is logical high and the set signal SETi is deactivated. Regardless of the frequency dividing signal FDi, the set signal SETi is maintained low to keep the switching circuit 101_i off.

In one embodiment, the controller further comprises a skip signal generator and a phase active indication signal generator. The skip signal generator is configured to generate a skip signal SET_OCP which indicates the requirement to skip the current switching circuit. The phase active indication signal generator adjusts the phase active indication signals Phase1_active~PhaseN_active based on the skip signal SET_OCP.

Figure 5:
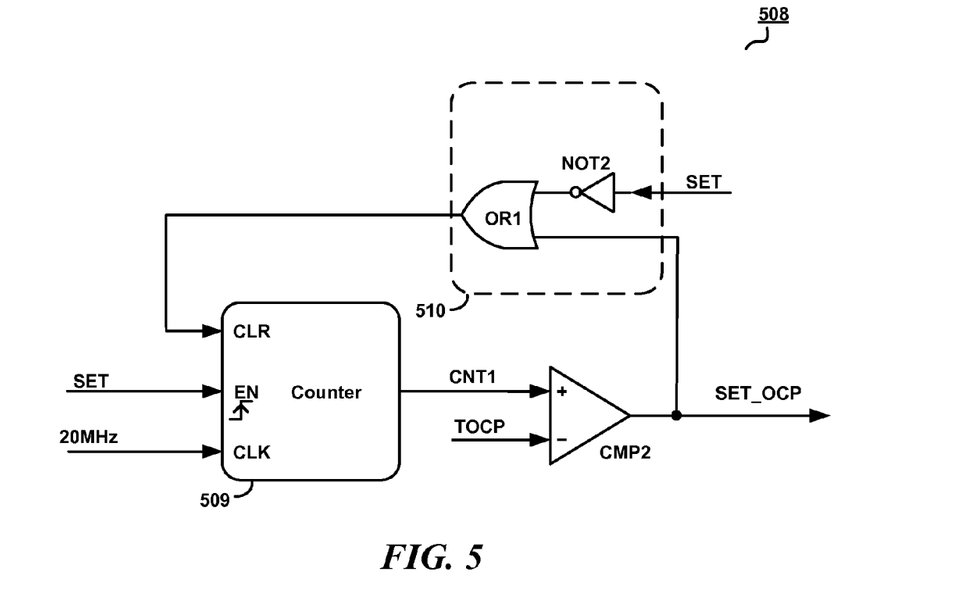
FIG. 5 schematically illustrates a skip signal generator 508 in accordance with one embodiment of the present invention.

FIG. 5 schematically illustrates a skip signal generator 508 in accordance with one embodiment of the present invention. The skip signal generator 508 comprises a counter 509, a comparator CMP2 and a resetting circuit 510. The counter 509 has a reset input terminal CLR, an enable input terminal EN, a clock input terminal CLK and an output terminal, wherein the enable input terminal EN is coupled to the comparing circuit 102 to receive the comparison signal SET, the cock input terminal CLK is configured to receive a clock signal (such as a pulse signal with 20 MHz frequency), and the output terminal is configured to provide a count value CNT1. The working principle of the counter 509 is well-known and will not be illustrated here. Persons with ordinary skill in the art can recognize that, the counter 509 may be replaced by any other timing circuits.

The comparator CMP2 has a non-inverting input terminal, an inverting input terminal and an output terminal, wherein the non-inverting input terminal is coupled to the output terminal of the counter 509 to receive the count value CNT1, the inverting input terminal is configured to receive a predetermined threshold value TOCP. The comparator CMP2 compares the count value CNT1 with the predetermined threshold value TOCP, and generates a skip signal SET_OCP at the output terminal. The resetting circuit 510 has a first input terminal, a second input terminal and an output terminal, wherein the first input terminal is coupled to the comparing circuit 102 to receive the comparison signal SET, the second input terminal is coupled to the output terminal of the comparator CMP2 to receive the skip signal SET_OCP, the output terminal is coupled to the reset input terminal CLR of the counter to provide a reset signal. In one embodiment, the resetting circuit 510 comprises an OR gate circuit OR1 and a NOT gate circuit NOT2. The NOT gate circuit NOT2 has an input terminal and an output terminal, wherein the input terminal is coupled to the comparing circuit 102 to receive the comparison signal SET. The OR gate circuit OR1 has a first input terminal, a second input terminal and an output terminal, wherein the first input terminal is coupled to the output terminal of the NOT gate circuit NOT2, the second input terminal is coupled to the output terminal of the comparator CMP2 to receive the skip signal SET_OCP, the output terminal is coupled to the reset input terminal CLR of the counter 509 to provide the reset signal.

When the comparison signal SET is changed from logical low into logical high (indicating the output voltage VOUT is changed from larger than the reference signal VREF into smaller than the reference signal VREF), the counter 509 is enabled and the count value CNT1 is increased. During normal operation, since the current switching circuit is normally turned on, the output voltage VOUT changes from smaller than the reference signal VREF into larger than the reference signal VREF before the count value CNT1 reaches the predetermined threshold value TOCP. The comparison signal SET is changed from logical high into logical low and the counter 509 is reset (such as clear the count value CNT1). The skip signal SET_OCP is maintained low.

When an over current condition of the current switching circuit is detected, the current switching circuit is kept off by the over current protection circuit. The output voltage VOUT decreases because of the load, and the comparison signal SET is maintained high. If the over current condition disappears before the count value CNT1 reaches the predetermined threshold value TOCP, the current switching circuit will be turned on immediately. The comparison signal SET will be changed from logical high into logical low soon. The counter 509 will be reset, and the skip signal SET_OCP will be maintained low. If the over current condition persists to let the count value CNT1 reach the predetermined threshold value TOCP, the skip signal SET_OCP will be changed from logical low into logical high, which indicates that the current switching circuit needs to be skipped. The counter 509 will also be reset.

Figure 6:
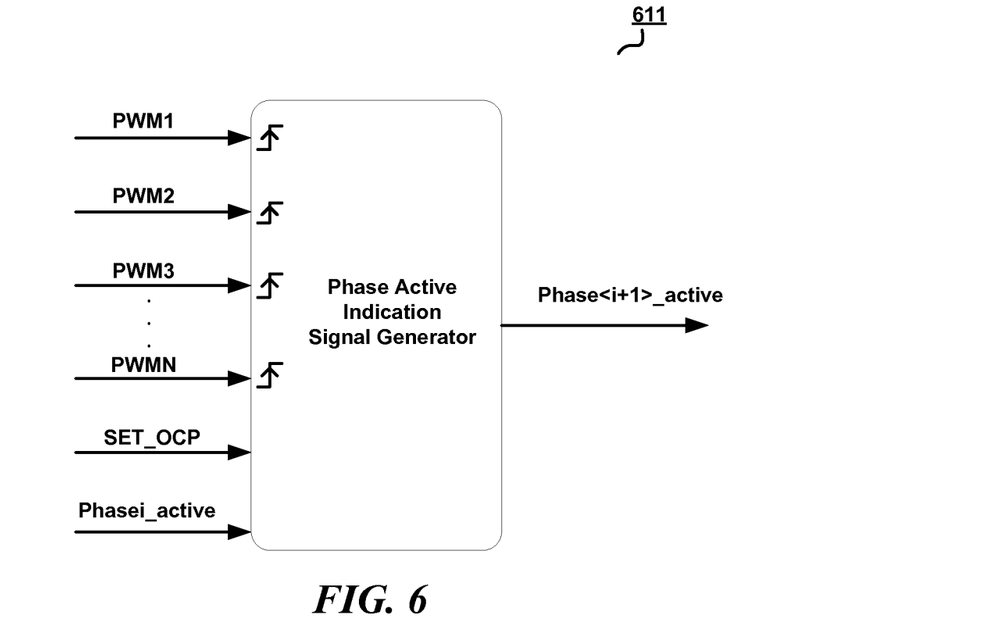
FIG. 6 schematically illustrates a phase active indication signal generator 611 in accordance with one embodiment of the present invention.

FIG. 6 schematically illustrates a phase active indication signal generator 611 in accordance with one embodiment of the present invention. The phase active indication signal generator 611 has N+2 input terminals and an output terminal, wherein the $1^{st}$ to $N^{th}$ input terminals are configured to receive the control signals PWM1~PWMN, the $N+1^{th}$ input terminal is coupled to the skip signal generator to receive the skip signal SET_OCP, the $N+2^{th}$ input terminal is configured to receive the phase active indication signal Phasei_active. Based on the control signal PWM<i+1>, the skip signal SET_OCP and the phase active indication signal Phasei_active, the phase active indication signal generator 611 generates the phase active indication signal Phase<i+1>_active at the output terminal. When the phase active indication signal Phasei_active is valid (such as logical high), if the control signal PWM<i+1> is changed from logical low into logical high (indicating the $i+1^{th}$ switching circuit is turned on) or the skip signal SET_OCP is logical high (indicating the current switching circuit needs to be skipped), the phase active indication signal Phase<i+1>_active will become valid (such as logical high).

For example, when the first switching circuit has been activated, the phase active indication signal Phase1_active is logical high, the comparison signal SET is transmitted to the over current protection circuit 306_2 as the frequency dividing signal FD2. If there is no over current condition in the second switching circuit, the control signal PWM2 will be changed from logical low into logical high when the comparison signal SET is logical high. The second switching circuit will be turned on and the phase active indication signal Phase2_active will become logical high. If the skip signal SET_OCP is logical high because of the over current condition of the second switching circuit, the second switching circuit will be skipped and the phase active indication signal Phase2_active will become logical high. In one embodiment, when the control signal PWM<i+1> is changed from logical low into logical high, the phase active indication signal Phase<i+1>_active is not validated immediately. It is validated after a delay or after a minimum off-time of the i+1$^{th}$ switching circuit.

Figure 7:
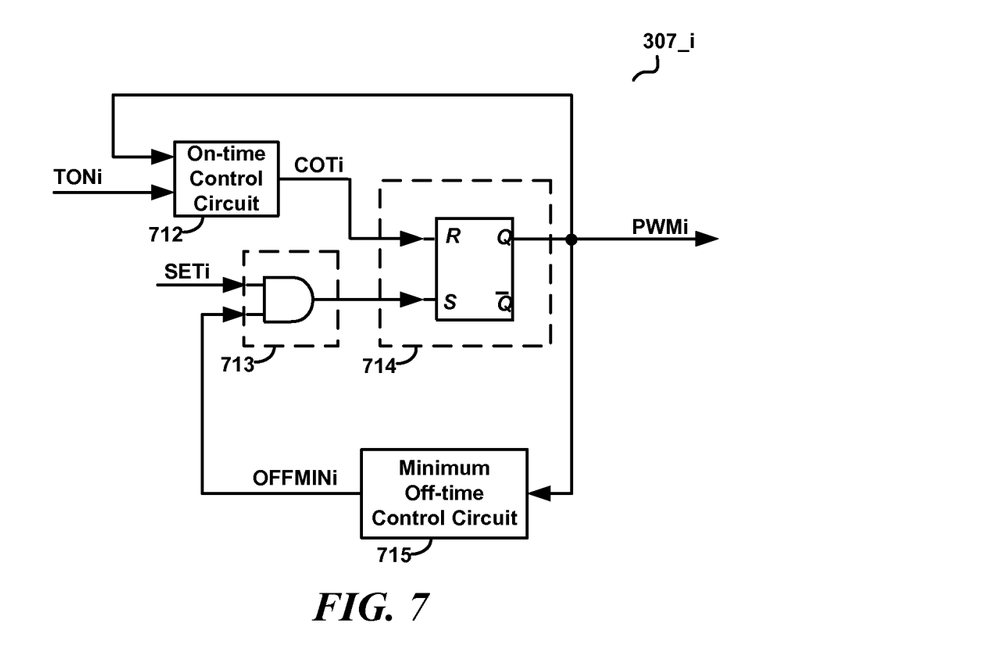
FIG. 7 schematically illustrates the sub-control circuit shown in FIG. 3 in accordance with one embodiment of the present invention.

FIG. 7 schematically illustrates the sub-control circuit shown in FIG. 3 in accordance with one embodiment of the present invention. The sub-control circuit 307_i comprises an on-time control circuit 712, a gate circuit 713, a logic circuit 714 and a minimum off-time control circuit 715. The on-time control circuit 712 is configured to generate an on-time control signal COTi based on the control signal PWMi and the on-time signal TONi. The minimum off-time control circuit 715 is configured to generate a minimum off-time control signal OFFMINi based on the control signal PWMi. The gate circuit 713 is configured to receive the set signal SETi and the minimum off-time control signal OFFMINi, and configured to generate a logic output signal based on these two signals. The logic circuit 714 is configured to generate the control signal PWMi based on the logic output signal and the on-time control signal COTi. In one embodiment, the gate circuit 713 is an AND gate circuit, and the logic circuit 714 is a RS flip-flop.

Figure 8:
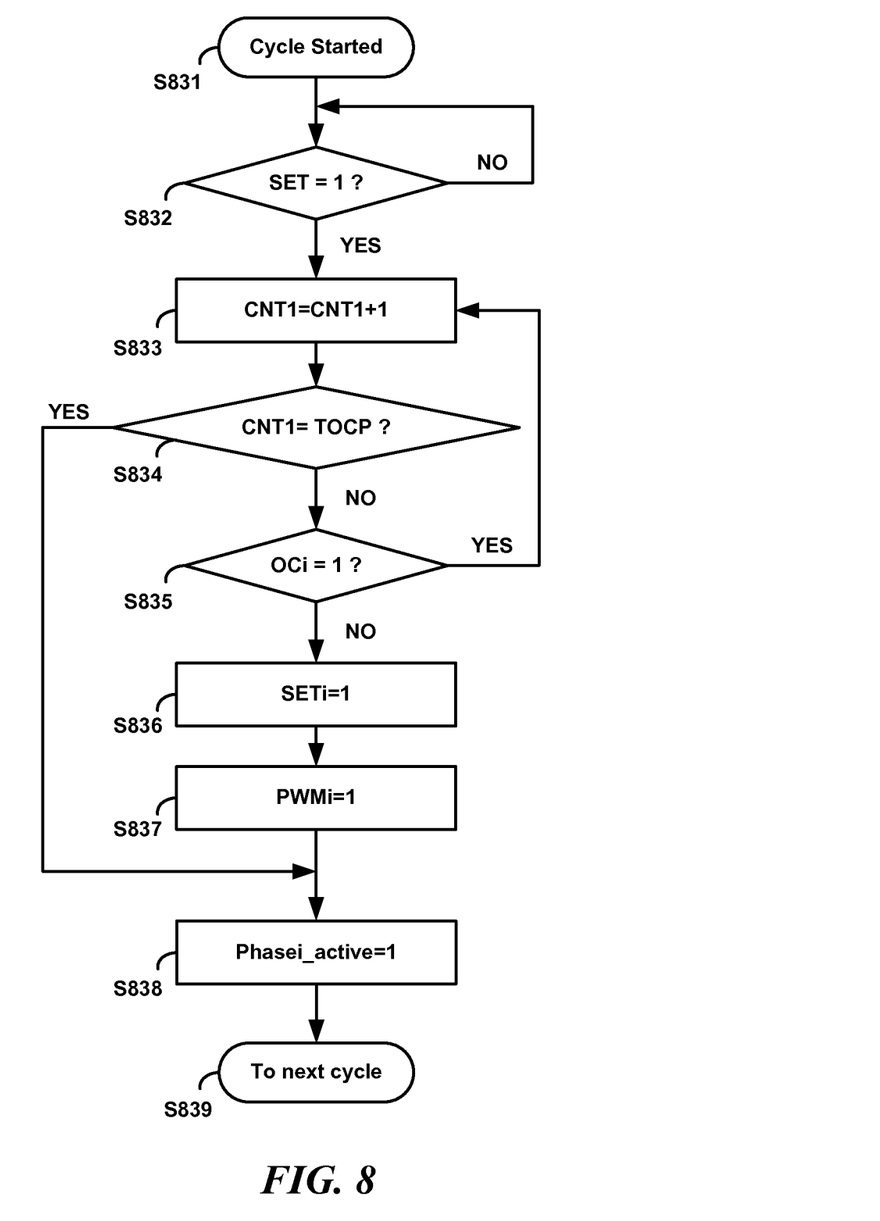
FIG. 8 is a working flow chart of the multi-phase switching converter 100 shown in FIG. 1 in accordance with one embodiment of the present invention.

FIG. 8 is a working flow chart of the multi-phase switching converter 100 shown in FIG. 1 in accordance with one embodiment of the present invention. It comprises steps S831~S839.

At step S831, a cycle is started.

At step S832, whether the output voltage VOUT is smaller than the reference signal VREF is detected. This may be realized by detecting whether the comparison signal SET is logical high. If the comparison signal SET is logical high, go to step S833, else, keep detecting.

As step S833, the count value CNT1 is increased by 1.

As step S834, whether the count value CNT1 reaches the predetermined threshold value TOCP is detected. If the count value CNT1 reaches the predetermined threshold value TOCP, go to step S838, else, go to step S835.

At step S835, whether the current switching circuit is over current is detected. This may be realized by detecting whether the over current detection signal OCi is logical high. If the over current detection signal OCi is logical high, go to step S833, else, go to step S836.

At step S836, the set signal SETi is changed into logical high.

At step S837, the control signal PWMi is changed into logical high to turn on the current switching circuit.

At step S838, the phase active indication signal Phase<i>_active is changed into logical high to indicate that the current switching circuit has been activated.

At step S839, turn into the next cycle wherein i is increased by 1.

Figure 9:
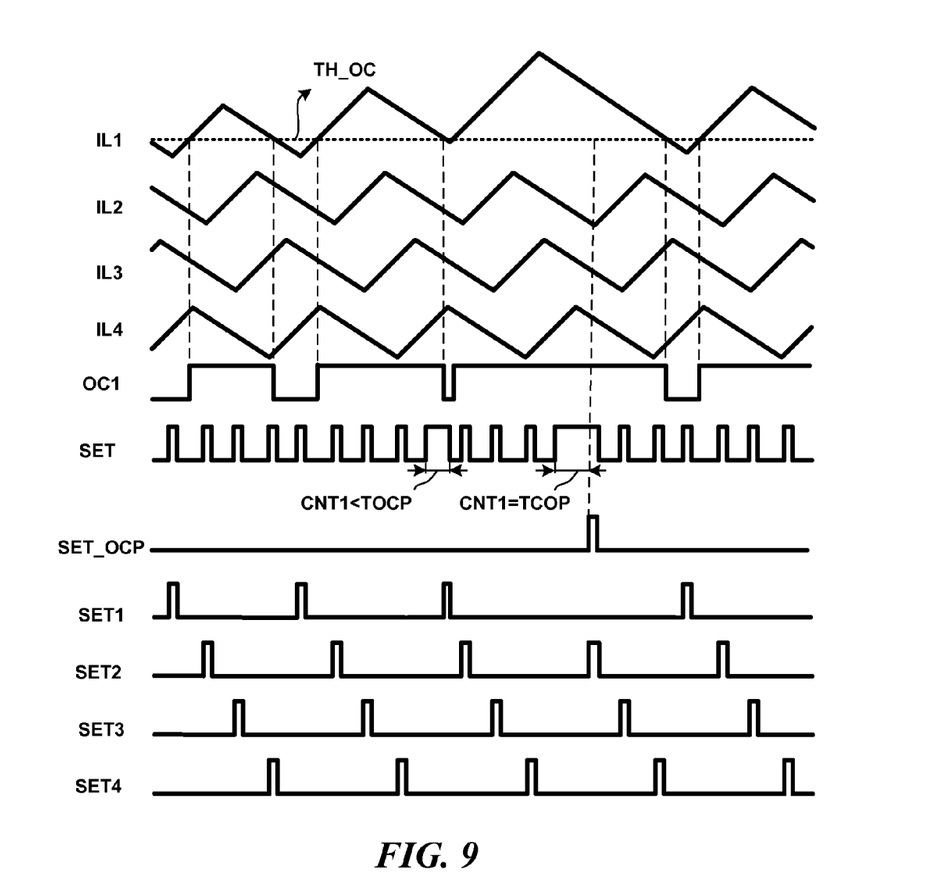
FIG. 9 is a working waveform of the multi-phase switching converter 100 shown in FIG. 1 in accordance with one embodiment of the present invention.

FIG. 9 is a working waveform of the multi-phase switching converter 100 shown in FIG. 1 in accordance with one embodiment of the present invention. As shown in FIG. 9, the counter 509 starts to count when the comparison signal SET is changed from logical low into logical high, the count value CNT1 is gradually increased. If the comparison signal SET is changed from logical high into logical low before the count value CNT1 reaches the predetermined threshold value TOCP, the counter 509 will be reset. The skip signal SET_OCP will be maintained low and the multi-phase switching converter will keep its normal operation. If the count value CNT1 is increased to reach the predetermined threshold value TOCP, the skip signal SET_OCP will be changed from logical low into logical high. The current switching circuit will be skipped and the counter 509 will be reset.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A controller used in a multi-phase switching converter, wherein the multi-phase switching converter comprises a plurality of switching circuits with each of the switching circuits having an output terminal, and each of the output terminals are coupled together to provide an output voltage to a load, the controller is configured to generate a plurality of control signals to control the plurality of switching circuits, wherein
when an over current condition is detected in one of the plurality of switching circuits, the controller skips the current switching circuit with the detected over current condition and successively turns on the remaining plurality of switching circuits that have not yet been turned on and where an over current condition has not been detected.

2. The controller of claim 1, wherein when an over current condition of the current switching circuit is detected, the controller keeps the current switching circuit off, the current switching circuit is skipped if the duration of the over current condition reaches a predetermined time threshold.

3. The controller of claim 1, comprising:
a comparing circuit coupled to the output terminals of the plurality of switching circuits, wherein the comparing circuit compares the output voltage with a reference signal, and generates a comparison signal;
a plurality of over current detection circuits respectively coupled to the plurality of switching circuits, wherein each of the plurality of over current detection circuits are configured to detect the over current condition of its corresponding switching circuit, and wherein a plurality of over current detection signals are generated; and
a control circuit coupled to the comparing circuit and the plurality of over current detection circuits to receive the comparison signal and the plurality of over current detection signals, wherein based on the comparison signal and the plurality of over current detection signals, the control circuit generates the plurality of control signals.

4. The controller of claim 3, wherein the control circuit comprises:
a frequency divider having an input terminal and a plurality of output terminals, wherein the input terminal is coupled to the comparing circuit to receive the comparison signal, and wherein based on the comparison signal, the frequency divider respectively generates a plurality of frequency dividing signals and outputs each corresponding frequency dividing signal at the corresponding output terminal of the plurality of output terminals;

a plurality of over current protection circuits, wherein each of the over current protection circuits has a first input terminal, a second input terminal and an output terminal, wherein the first input terminal is coupled to the corresponding output terminal of the frequency divider to receive the frequency dividing signal, the second input terminal is coupled to the corresponding over current detection circuit to receive the over current detection signal, and wherein based on the frequency dividing signal and the over current detection signal, the over current protection circuit generates a set signal at the output terminal; and a plurality of sub-control circuits, wherein each of the sub-control circuits has a first input terminal, a second input terminal and an output terminal, and wherein the first input terminal is coupled to the output terminal of the corresponding over current protection circuit to receive the set signal, the second input terminal is configured to receive an on-time signal indicating the expected on-time of the corresponding switching circuit, and the output terminal is coupled to the corresponding switching circuit to provide the control signal.

5. The controller of claim 3, wherein each of the over current detection circuits comprises a first comparator having a first input terminal, a second input terminal and an output terminal, wherein the first input terminal is configured to receive a current sensing signal indicating the output current of the corresponding switching circuit, the second input terminal is configured to receive an over current threshold voltage, and wherein the first comparator compares the current sensing signal with the over current threshold voltage, and generates the over current detection signal at the output terminal.

6. The controller of claim 4, wherein each of the over current protection circuits comprises:
a NOT gate circuit having an input terminal and an output terminal, wherein the input terminal is coupled to the corresponding over current detection circuit to receive the over current detection signal; and
an AND gate circuit having a first input terminal, a second input terminal and an output terminal, wherein the first input terminal is coupled to the corresponding output terminal of the frequency divider to receive the frequency dividing signal, the second input terminal is coupled to the output terminal of the NOT gate circuit, and the output terminal is configured to provide the set signal.

7. The controller of claim 4, wherein the control circuit further comprises:
a counter having a first input terminal, a second input terminal, a third input terminal and an output terminal, wherein the second input terminal is coupled to the comparing circuit to receive the comparison signal, the third input terminal is configured to receive a clock signal, and the output terminal is configured to provide a count value;
a second comparator having a first input terminal, a second input terminal and an output terminal, wherein the first input terminal is coupled to the output terminal of the counter to receive the count value, the second input terminal is configured to receive a predetermined threshold value, and wherein the second comparator compares the count value with the predetermined threshold value, and generates a skip signal at the output terminal; and a resetting circuit having a first input terminal, a second input terminal and an output terminal, wherein the first input terminal is coupled to the comparing circuit to receive the comparison signal, the second input terminal is coupled to the output terminal of the second comparator to receive the skip signal, the output terminal is coupled to the first input terminal of the counter to provide a reset signal, and wherein the plurality of frequency dividing signals are adjusted by the frequency divider based on the skip signal.

8. A multi-phase switching converter, comprising:
a plurality of switching circuits with each of the switching circuits having an output terminal, wherein each of the output terminals are coupled together to provide an output voltage to a load; and
a controller configured to generate a plurality of control signals to control the plurality of switching circuits, and wherein when an over current condition of a current switching circuit of the plurality of switching circuits is detected, the controller skips the current switching circuit and successively turns on the remaining plurality of switching circuits that have not yet been turned on and where an over current condition has not been detected.

9. The multi-phase switching converter of claim 8, wherein when an over current condition of the current switching circuit is detected, the controller keeps the current switching circuit off, the current switching circuit will be skipped if the duration of the over current condition reaches a predetermined time threshold.

10. The multi-phase switching converter of claim 8, wherein the controller comprises:
a comparing circuit coupled to the output terminals of the plurality of switching circuits, wherein the comparing circuit compares the output voltage with a reference signal, and generates a comparison signal;
a plurality of over current detection circuits respectively coupled to the plurality of switching circuits, wherein each of the plurality of over current detection circuits are configured to detect the over current condition of its corresponding switching circuit, and wherein a plurality of over current detection signals are generated; and
a control circuit coupled to the comparing circuit and the plurality of over current detection circuits to receive the comparison signal and the plurality of over current detection signals, wherein based on the comparison signal and the plurality of over current detection signals, the control circuit generates the plurality of control signals.

11. The multi-phase switching converter of claim 10, wherein the control circuit comprises:
a frequency divider having an input terminal and a plurality of output terminals, wherein the input terminal is coupled to the comparing circuit to receive the comparison signal, and wherein based on the comparison signal, the frequency divider respectively generates a plurality of frequency dividing signals and outputs each corresponding frequency dividing signal at the corresponding output terminal of the plurality of output terminals;
a plurality of over current protection circuits, wherein each of the over current protection circuits has a first input terminal, a second input terminal and an output terminal, wherein the first input terminal is coupled to the corresponding output terminal of the frequency divider to receive the frequency dividing signal, the second input terminal is coupled to the corresponding over current detection circuit to receive the over current detection signal, and wherein based on the frequency dividing signal and the over current detection signal, the over current protection circuit generates a set signal at the output terminal; and a plurality of sub-control circuits, wherein each of the sub-control circuits has a first input terminal, a second input terminal and an output terminal, and wherein the first input terminal is coupled to the output terminal of the corresponding over current protection circuit to receive the set signal, the second input terminal is configured to receive an on-time signal indicating the expected on-time of the corresponding switching circuit, and the output terminal is coupled to the corresponding switching circuit to provide the control signal.

12. The multi-phase switching converter of claim 10, wherein each of the over current detection circuits comprises a first comparator having a first input terminal, a second input terminal and an output terminal, wherein the first input terminal is configured to receive a current sensing signal indicating the output current of the corresponding switching circuit, the second input terminal is configured to receive an over current threshold voltage, and wherein the first comparator compares the current sensing signal with the over current threshold voltage, and generates the over current detection signal at the output terminal.

13. The multi-phase switching converter of claim 11, wherein each of the over current protection circuits comprises:

a NOT gate circuit having an input terminal and an output terminal, wherein the input terminal is coupled to the corresponding over current detection circuit to receive the over current detection signal; and an AND gate circuit having a first input terminal, a second input terminal and an output terminal, wherein the first input terminal is coupled to the corresponding output terminal of the frequency divider to receive the frequency dividing signal, the second input terminal is coupled to the output terminal of the NOT gate circuit, and the output terminal is configured to provide the set signal.

14. The multi-phase switching converter of claim 11, wherein the control circuit further comprises:

a counter having a first input terminal, a second input terminal, a third input terminal and an output terminal, wherein the second input terminal is coupled to the comparing circuit to receive the comparison signal, the third input terminal is configured to receive a clock signal, and the output terminal is configured to provide a count value;

a second comparator having a first input terminal, a second input terminal and an output terminal, wherein the first input terminal is coupled to the output terminal of the counter to receive the count value, the second input terminal is configured to receive a predetermined threshold value, and wherein the second comparator compares the count value with the predetermined threshold value, and generates a skip signal at the output terminal; and a resetting circuit having a first input terminal, a second input terminal and an output terminal, wherein the first input terminal is coupled to the comparing circuit to receive the comparison signal, the second input terminal is coupled to the output terminal of the second comparator to receive the skip signal, the output terminal is coupled to the first input terminal of the counter to provide a reset signal;

wherein the plurality of frequency dividing signals are adjusted by the frequency divider based on the skip signal.

15. A control method used in a multi-phase switching converter, wherein the multi-phase switching converter comprises a plurality of switching circuits with each of the switching circuits having an output terminal, the output terminals of the plurality of switching circuits are coupled together to provide an output voltage to a load, the control method comprises:

detecting whether a current switching circuit of the plurality of switching circuits is in an over current condition; and when an over current condition of the current switching circuit is detected, skipping the current switching circuit and successively turning on the remaining plurality of switching circuits that have not yet been turned on and are not in an over current condition.

16. The control method of claim 15, wherein when an over current condition of a current switching circuit is detected, the current switching circuit is kept off, the current switching circuit will be skipped if the duration of the over current condition reaches a predetermined time threshold.

17. The control method of claim 15, further comprising:

comparing the output voltage with a reference signal to generate a comparison signal;

generating a plurality of control signals to control the plurality of switching circuits based on the comparison signal;

keeping the current switching circuit off when an over current condition of the current switching circuit is detected;

starting timing to generate a time value when the output voltage is smaller than the reference signal;

resetting the timing when the output voltage is larger than the reference signal; and skipping the current switching circuit and resetting the timing when the time value reaches a predetermined time threshold.

* * * * *